United States Patent [19]
Kajiwara et al.

[11] 3,949,302
[45] Apr. 6, 1976

[54] RADIO RECEIVER

[75] Inventors: Daisuke Kajiwara; Mitsuru Ishimaru, both of Fukuoka, Japan

[73] Assignee: Matsushita Electric Industrial Co., Ltd., Osaka, Japan

[22] Filed: Jan. 29, 1975

[21] Appl. No.: 544,887

Related U.S. Application Data

[63] Continuation of Ser. No. 321,791, Jan. 8, 1973, abandoned.

[52] U.S. Cl. .................. 325/352; D56/4 B; 339/2 R
[51] Int. Cl.² .............................................. H04B 1/08
[58] Field of Search .......... 174/35, 38; 220/4, 23.2; 179/1 PC, 156; D56/4 B; 317/101 R, 101 CB, 101 CE, 117; 339/2 R, 2 L, 6 R, 8 R, 8 A, 8 PB, 241, 245; 325/310, 352, 353, 354, 355, 356, 361

[56] References Cited
UNITED STATES PATENTS

| | | | |
|---|---|---|---|
| 3,152,218 | 10/1964 | Blanco | 339/2 L |
| 3,184,911 | 5/1965 | Canale et al. | 325/310 X |
| 3,322,886 | 5/1967 | Warshawsky | 339/2 R |
| 3,488,565 | 1/1970 | Teltscher | 325/352 X |
| D216,050 | 11/1969 | Gerb | D56/4 B |

*Primary Examiner*—Benedict V. Safourek
*Attorney, Agent, or Firm*—Stevens, Davis, Miller & Mosher

[57] ABSTRACT

A radio receiver having a cabinet consisting of a plurality of cabinet sections, which are joined to one another and can be brought to and held in a doughnut-like state. Adjacent sections of the cabinet are rotatably joined together by means of a coupling member penetrating aligned holes formed in respective walls of adjacent cabinet sections. The outer shape or appearance of the receiver cabinet can thus be varied according to the user's taste. The receiver is very unique and can be used both as a table radio set and as a portable radio set.

4 Claims, 30 Drawing Figures

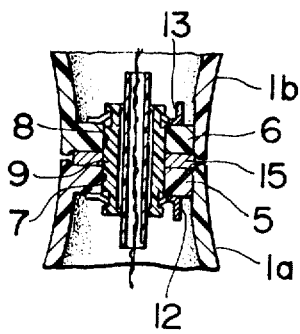
FIG. 4
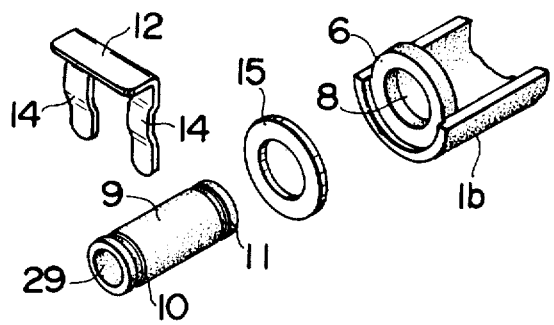
FIG. 5
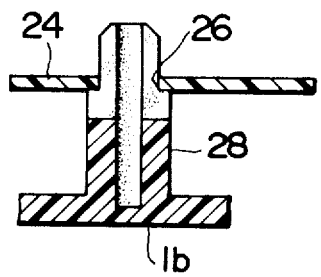
FIG. 6
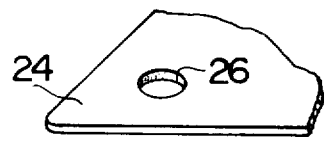
FIG. 7
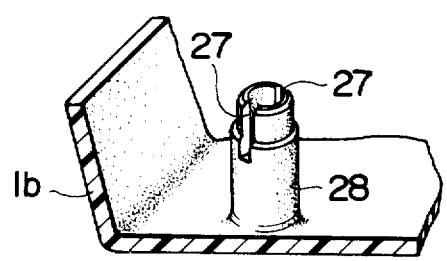

FIG. 20A     FIG. 20B     FIG. 20C
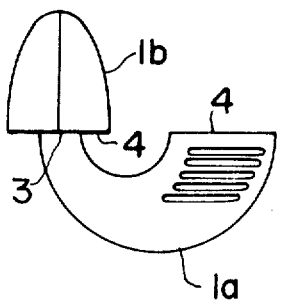 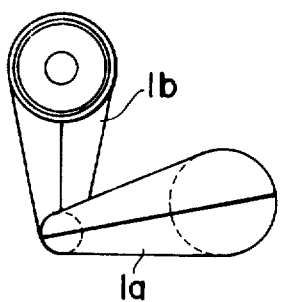 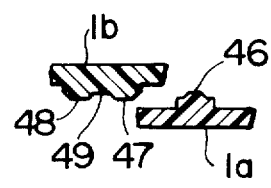
FIG. 21A     FIG. 21B     FIG. 21C
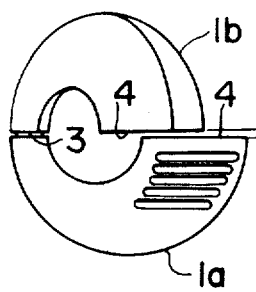 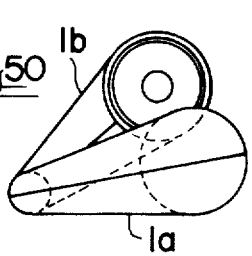 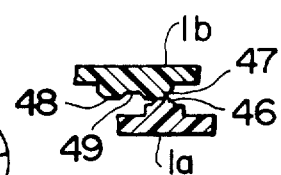
FIG. 22A     FIG. 22B     FIG. 22C
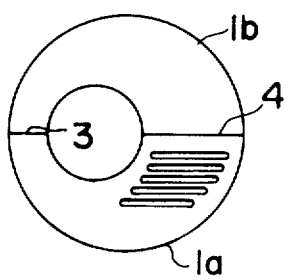 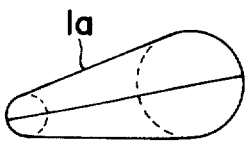 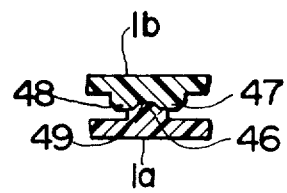

RADIO RECEIVER

This is a continuation of application Ser. No. 321,791, filed Jan. 8, 1973, now abandoned.

This invention relates to a radio receiver having a cabinet, which consists of a plurality of cabinet sections rotatably joined to one another and can be brought to and held in a doughnut-like state.

The customary radio receivers has a cabinet of a fixed box-like outer shape. Therefore, radio receivers designed as portable radio sets are sometimes unsuitable for use as table radio set, while those designed as table radio sets are sometimes unsuitable as portable radio set. Besides, the fixed cabinet shape may not always agree with the user's taste.

One object of the present invention is to provide a radio receiver, whose outer shape may be varied according to the user's taste.

A second object of the invention is to provide a radio receiver, which has a unique appearance and can be conveniently used both as a table radio set and as a portable radio set.

A third object of the invention is to provide a radio receiver, whose cabinet consists of a plurality of cabinet sections capable of being rotated relative to one another and held in desired angular positions.

Preferred embodiments of the radio receiver according to the invention will be described hereinafter in connection with the accompanying drawing, in which:

FIG. 4 is a fragmentary sectional view, to an enlarged scale, taken along line IV—IV in FIG. 3;

FIG. 5 is an exploded perspective view of some parts shown in FIG. 4;

FIG. 6 is a fragmentary sectional view, to an enlarged scale, showing a printed circuit board and a support therefore;

FIG. 7 is a fragmentary exploded perspective view showing the same printed circuit board and support therefor.

FIGS. 18A, 18B, 19A, 19B and 20A, 20B, 20C to 22A, 22B, 22C are explanatory views to illustrate the features of the embodiment of FIG. 17.

Figure 1:
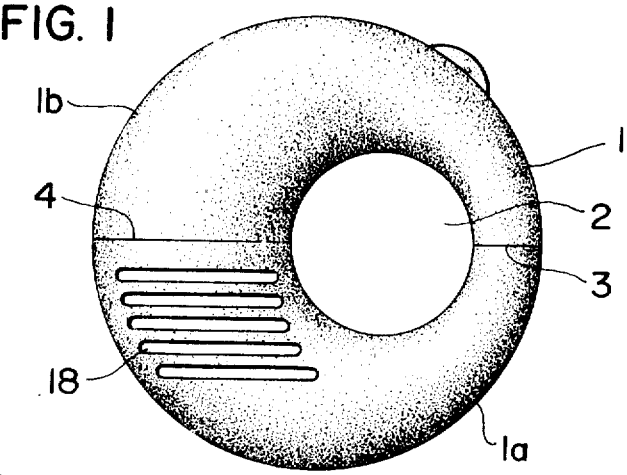
FIG. 1 is a plan view of an embodiment of the radio receiver according to the invention.

Referring to the drawing, more particularly to FIGS. 1 to 14, reference numeral 1 designates a radio receiver cabinet or casing accommodating component parts of a radio receiver unit. In its usual portable state, the cabinet 1 has a doughnut-like outer shape with a central eccentric opening 2. The cabinet 1 consists of two cabinet halves 1a and 1b which are symmetric with each other with respect to a central plane. These cabinet halves 1a and 1b are joined together in one of their junctures 3 and 4. In one of their junctures, namely juncture 3, the cabinet halves 1a and 1b have respective integral transversal walls 5 and 6 which are formed with respective openings 7 and 8 aligned to each other and of the same size. Penetrating the openings 7 and 8 is a tubular coupling member 9 having a sufficient length and formed near its opposite ends with outer circumferential grooves 10 and 11. Plate spring members 12 and 13 each having a configuration as shown in FIG. 5 respectively fit against the inner sides of the transversal walls 5 and 6 and have respective arcuate leg portions 14 received in the associated circumferential grooves 10 and 11 of the coupling member 9 such that these spring members exert clamping forces on the coupling member and that the cabinet halves 1a and 1b are rotatable relative to each other about the coupling member. A washer 15 made of a synthetic resin is sandwiched between the transversal walls 5 and 6, so that very smooth relative rotation of the cabinet halves 1a and 1b is ensured.

Figure 2:
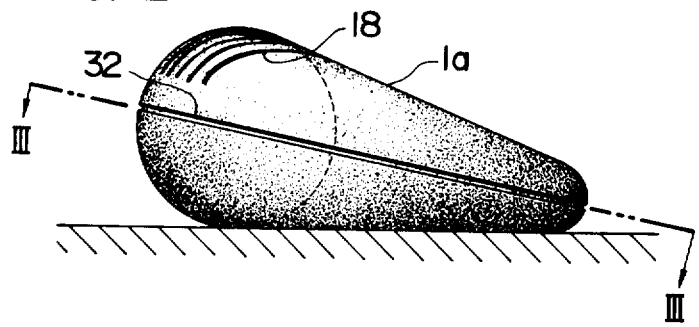
FIG. 2 is an elevational view of the same radio receiver.

As is shown in FIG. 2, each cabinet half 1a or 1b is separable into two symmetric sections symmetric with respect to a plane 32, so that various component parts of the receiver unit may be readily mounted in and removed from the associated cabinet half. The transversal dimension of the cabinet halves 1a and 1b is smallest at the juncture 3 and becomes progressively greater toward the juncture 4.

Figure 3:
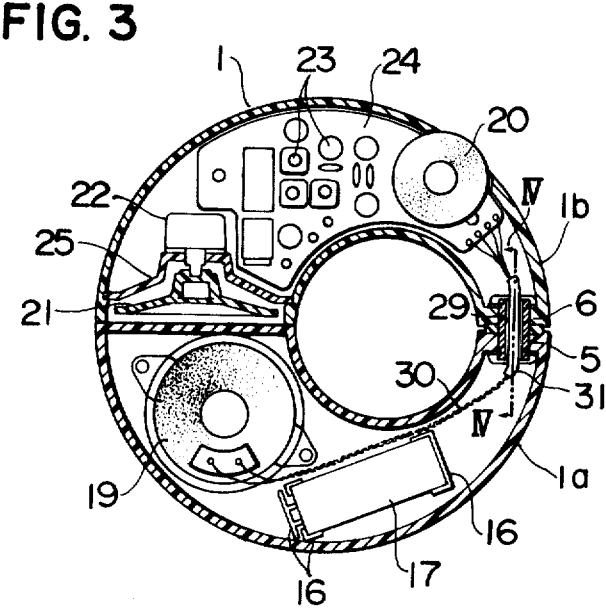
FIG. 3 is a sectional view taken along line III—III in FIG. 2.

As is shown in FIG. 3, the cabinet half 1a is provided with a battery mount 16, in which a battery 17 is mounted. Also, a loudspeaker 19 is mounted in this cabinet half in a position adjacent slit arrangements 18. In the other cabinet half 1b, a power-switch/volume control dial 20, a variable capacitor tuner 22 with a dial knob 21 and a printed circuit board 24 carrying various electric circuit parts 23 are mounted. The variable capacitor tuner 25 is provided behind a dial board 22 provided in the cabinet half 1b adjacent the juncture 4, and its rotary shaft penetrates the dial board 25 and carries the dial knob 21 in front thereof. The printed circuit board 24 is mounted by pressure fitting its hole 26 on a cylindrical support 28, which inwardly extends from the cabinet half 1b and is formed with an axial groove in its end portion.

Leads 30 connecting various electric parts mounted within the cabinet halves 1a and 1b extend through the bore 29 of the tubular coupling member 9. They are bundled together and passed through a protection tube 31, which extends through the bore 29 of the tubular member 9.

Figure 8:
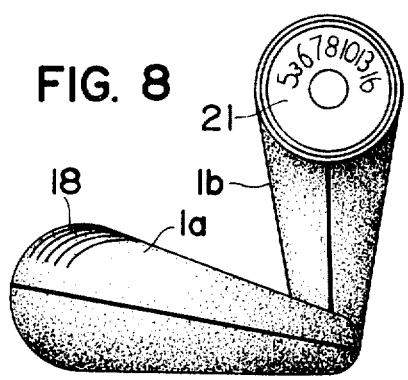
FIGS. 8 to 11 are views of the same radio receiver in some states of use.
Figure 9:
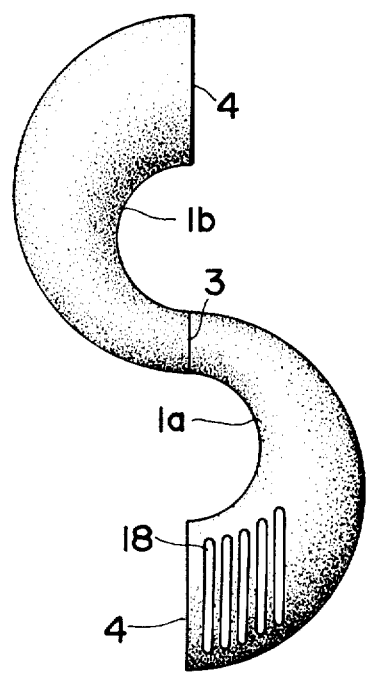
Figure 10:
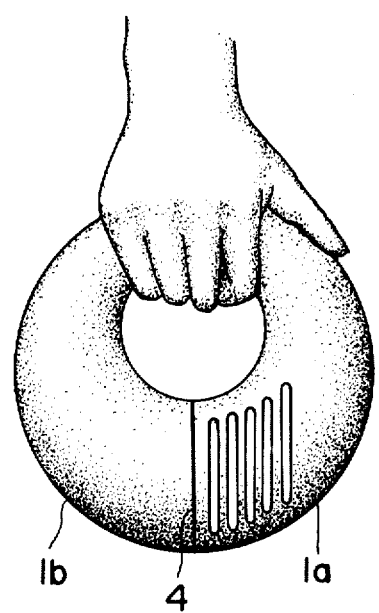
Figure 11:
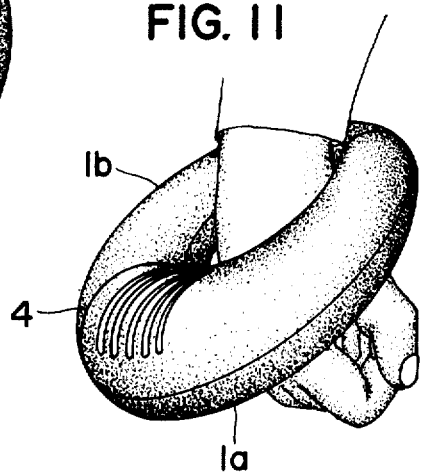

Since the radio receiver of the above embodiment has the cabinet halves 1a and 1b rotatably joined together at the juncture 3 thereof, its outer shape may be varied by rotating the cabinet halves about the juncture 3. For example, it may be rendered into a unique shape as shown in FIG. 8 for use as a table radio set. Also, it may be rendered into an S-shaped form by rotating the cabinet halves 1a and 1b 180° from the state of FIG. 1. Further, it may be carried in its ring or doughnut-like shape as shown in FIGS. 10 or 11. In this way, it can be desirably used as a table radio set or as portable radio set. In the case of using it as a table radio set, it may be rendered into any desired shape well-matched with surroundings and furnitures by merely varying the relative angular positions of the cabinet halves 1a and 1b. In the case of using it as a portable radio set, it may be carried along in its doughnut-like form by gripping its thinner portion adjacent the juncture 3 as shown in FIG. 10 or bearing it just like a bracelet as shown in FIG. 11.

In addition, since the cabinet halves 1a and 1b are coupled together with the coupling member 9 penetrating the transversal walls 5 and 6 of these halves and with plate spring members 12 and 13 received in the respective circumferential grooves formed in the coupling member 9 near the opposite ends thereof and exerting forces tending to clamp the member 9, it is possible to provide adequate and sufficient frictional resistance between the opposing transversal walls 5 and 6 to hold the cabinet halves 1a and 1b at desired angular positions relative to each other. Also, since the washer 15 intervenes between the transversal walls 5 and 6, the relative rotation of the cabinet halves 1a and 1b may be effected very smoothly. Further, the fact that the various electric component parts housed in the cabinet halves 1a and 1b are connected by the leads 30 passing through the bore 29 of the tubular coupling member 9 is very advantageous from the standpoint of appearance. Furthermore, the leads 30 will hardly be twisted too much to be broken with the relative rotation of the cabinet halves 1a and 1b. Besides, since the leads 30 are protected by the protection tube 9 for their portion extending in the bore 29, they will not wear due to friction with the coupling member 9, thus preventing otherwise possible short-circuit troubles.

Moreover, since comparatively heavy component parts such as battery 17 and loudspeaker 19 are housed within one of the cabinet halves, namely cabinet half 1a, while comparatively light parts such as printed circuit board 24 and dial knob 21 are housed within the other cabinet half 1b, while the receiver unit may be stably placed on a table by laying the cabinet half 1a on the table no matter what position the other cabinet half 1b assumes.

While the cabinet halves 1a and 1b in the preceding embodiment have had an arcuate contour, they may also have any other suitable outer contour such as part of a polygon or an ellipse. Also, they need not be circular in transversal section, but they may have any other suitable transversal geometrical profile, such as a quadrilateral or any other polygonal one.

Further, while the preceding embodiment has used the plate spring members 12 and 13 to urge the opposing transversal walls 5 and 6 of the cabinet halves 1a and 1b toward each other, it is also possible to use a coil spring to the same end.

Figure 12:
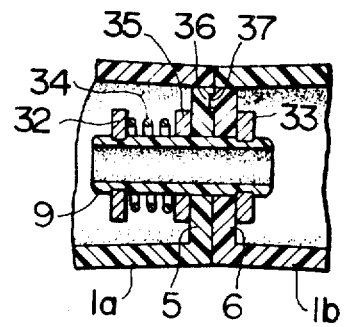
FIG. 12 is a fragmentary sectional view of another embodiment of the invention, particularly showing joined ends of two cabinet halves.

FIG. 12 shows another embodiment, which uses a coil spring as means to provide forces urging the transversal walls 5 and 6 of the cabinet halves 1a and 1b against each other. In the Figure, reference numerals 32 and 33 designate E-rings fitted in the respective circumferential grooves in the coupling member 9, and numeral 34 coil spring intervening between E-ring 32 and washer 35 fitted on a central portion of the coupling member 9. In this embodiment, the urging force of the coil spring 34 to urge the transversal walls 5 and 6 against each other may be desirably adjusted by appropriately adjusting the spring force of the coil spring.

Figure 13:
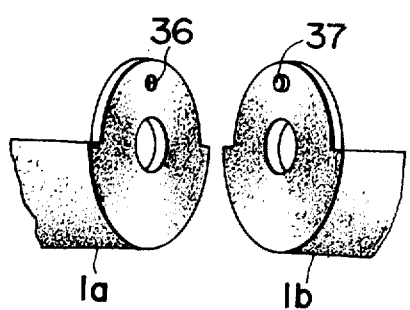
FIG. 13 is a fragmentary exploded perspective view of the joined ends of cabinet halves shown in FIG. 12.

Also, as shown in FIGS. 12 and 13, by forming a recess 36 in one of the transversal walls, namely wall 5, and providing the other wall 6 with a protuberance 37 to be engaged in the recess 36, a nodal or detent character may be imparted to the relative rotation of the cabinet halves 1a and 1b.

Figure 14:
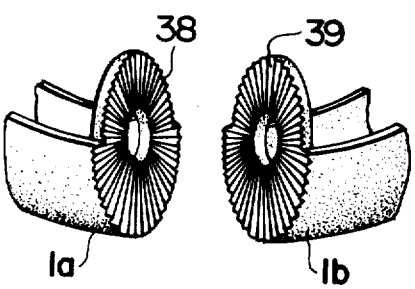
FIG. 14 is a view similar to FIG. 13 but showing a further embodiment of the invention.

Further, to the end of imparting a nodal character radial roulettes 38 and 39 may be formed in the mating sides of the transversal walls 5 and 6, as shown in FIG. 14. In this case, it is possible to provide a nodal character for each subdivided angular interval, which is very advantageous in case when it is desired to bring and hold the cabinet halves 1a and 1b at predetermined angular positions.

Figure 15:
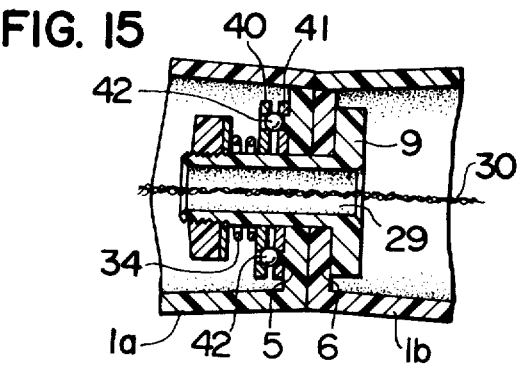
FIG. 15 is a fragmentary sectional view showing a still further embodiment of the invention, particularly joined ends of cabinet halves.
Figure 16:
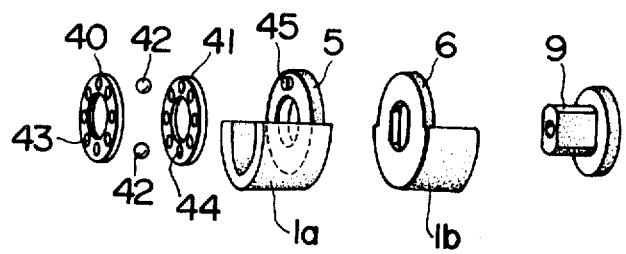
FIG. 16 is an exploded perspective view showing some parts shown in FIG. 15.
Figure 17:
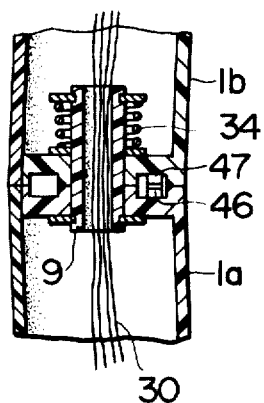
FIG. 17 is a fragmentary sectional view showing yet another embodiment of the invention, particularly joined ends of cabinet halves.
Figure 18A:
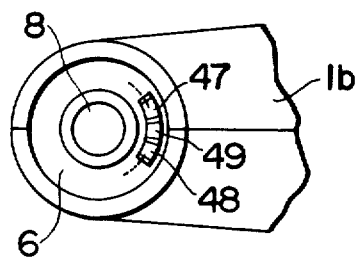
Figure 18B:
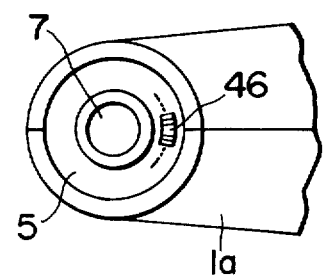
Figure 19A:
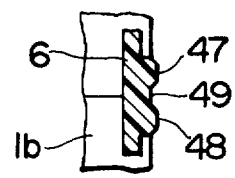
Figure 19B:
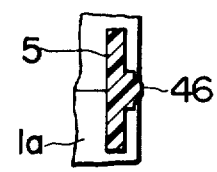

FIGS. 15 and 16 show a modification of the embodiment of FIG. 14. In this modification, to the end of providing a subdivided nodal character to the relative rotation of the cabinet halves 1a and 1b separate use is made of discs 40 and 41 and balls 42. Here, the coupling member 9 is made integral with one of the cabinet halves, namely cabinet half 1b, and the discs 40 and 41 which are formed with radially arranged small holes 43 and 44 are fitted on the member 9. The disc 40 is adapted to rotate in unison with the coupling member 9, while the other disc 41 is adapted to rotate in unison with the cabinet half 1a. When the cabinet halves 1a and 1b are rotated relative to each other, the discs 40 and 41 are similarly rotated relative to each other. The balls 42 are interposed between the discs 40 and 41, and the disc 40 is urged by coil spring 34 toward the disc 41. With this arrangement, a nodal character is imparted to the relative rotation of the discs 40 and 41, thus imparting a nodal character to the relative rotation of the cabinet halves 1a and 1b. To provide for the rotation of the disc 41 in unison with the cabinet half 1a, protuberances 45 projecting from the inner side of the transversal wall 5 of the cabinet half 1a are fitted in some holes in the disc 41.

FIGS. 17 to 19A, 19B show a further embodiment, wherein the cabinet halves 1a and 1b may be returned from their non-aligned state to the doughnut-shaped aligned state without the possibility for their ends defining the juncture 4 to be struck by each other. To this end, a protuberance 46 is provided in the transversal wall 5 of the cabinet half 1a, and two protuberances 47 and 48 are provided in the transversal wall 1b, of the cabinet half 1b on opposite sides of a recess 49 also formed in the transversal wall 6 such that the protuberance 46 can ride on either protuberance 47 or 48 and be received in the recess 49. Strictly speaking, the protuberances 46, 47 and 48 and recess 49 are arcuate concentric with the openings 7 or 8 formed in the transversal wall 5 or 6, and protuberances 46, 47 and 48 have such height that when the protuberance 46 is received in the recess 49 the ends of the cabinet halves 1a and 1b forming the juncture 4 are in contact with each other along the entire circumference.

With this construction, as the ends of the cabinet halves 1a and 1b forming the juncture 4 approach each other, the protuberance 46 rides on the protuberance 47 or 48 against the force of the coil spring 34, thereby forming a gap 50 between the approaching ends of the cabinet halves 1a and 1b. In this way, the approaching ends can be brought into register without being struck by one another.

In a state shown in FIGS. 20A to 20C where the central planes of the cabinet halves 1a and 1b make an angle of 90°, the protuberance 46 is spaced from the protuberance 47 or 48. In this state, the transversal walls 5 and 6 forming the juncture 3 are in contact with each other. However, as the angle between the cabinet halves 1a and 1b is reduced with the relative rotation thereof the protuberance 46 rides on the protuberance 47 or 48. As a result, a gap 50 is formed between the ends of the cabinet halves 1a and 1b forming the juncture 4 as shown in FIG. 21 before these ends come to partially overlap each other. Thus, these approaching ends will not be struck by one another. When the angle between the cabinet halves 1a and 1b is reduced to zero with further rotation thereof, at which time the ends of the cabinet halves 1a and 1b forming the juncture 4 completely overlap, the protuberance 46 is received in the recess 49. As a result, the approaching ends of the cabinet halves 1a and 1b forming the juncture 4 will get into contact with each other along the entire circumference, as shown in FIG. 22. In this way, the cabinet halves 1a and 1b can be rotated back to their initial doughnut-like aligned state without the possibility for their ends defining the juncture 4 to be struck by each other, so that it is less likely to cause damage to the cabinet halves.

What is claimed is:

1. A radio receiver assembly comprising:
    a radio receiver,
    a cabinet consisting of a pair of cabinet sections, each cabinet section containing at least some of the components of said radio receiver and having an integral transversal wall at one end portion thereof in which an opening is formed, said opening being arranged so as to be aligned with a corresponding opening of the adjacent cabinet section,
    a tubular coupling member for joining said cabinet sections inserted into said openings formed in said two adjacent integral transversal walls, and
    a pair of spring members mounted on said tubular coupling member against said two transversal walls respectively, said spring members exerting a clamping force through said coupling member thereby securely joining said cabinet sections and enabling said cabinet sections to rotate with respect to each other about the axis of said tubular coupling member.

2. A radio receiver according to claim 1, wherein radial roulettes are formed on the mating surfaces of the integral transversal walls of said adjacent cabinet sections.

3. A radio receiver according to claim 1, wherein said tubular coupling member is adapted to rotate in a unit with one of the integral transversal walls of said adjacent cabinet sections, and
    said tubular coupling member is further provided with,
    a disc having a number of small holes, said disc being fitted on said coupling member so as to rotate in a unit therewith,
    a further disc having a number of small holes, said further disc being fitted on an inner surface of the other integral transversal wall thereof so as to rotate in a unit therewith, and
    a plurality of balls interposed loosely between the holes of said discs.

4. A joint cabinet structure for a radio receiver comprising:
    a doughnut-like cabinet for housing electrical parts which consists of two cabinet halves divided symmetrically by a vertical plane, one juncture of said two cabinet halves being a joining portion,
    a tubular coupling member and a coil spring mounted on said joining portion of the cabinet halves so that the cabinet halves are securely joined but rotatable with respect to each other about the axis of said tubular coupling member,
    a first protuberance mounted on a joining surface of one of said cabinet halves, and
    a pair of second protuberances each having a flat top and forming a recess therebetween, said pair of second protuberances being mounted on a joining surface of the other of said cabinet halves so as to enable said first protuberance to ride on either one of said pair of second protuberances and be received in said recess in accordance with the direction of relative rotation of said cabinet halves, the height and the flat top length of each of said pair of second protuberances being determined such that, during the travel of said first protuberance riding on either of said pair of second protuberances, the end surfaces of said pair of cabinets in the other juncture other than the joining juncture are spaced from each other by a gap formed therebetween thereby preventing approaching end surfaces of said pair of cabinet halves from being struck by each other.

* * * * *